(12) United States Patent
Matsuhashi et al.

(10) Patent No.: US 12,743,075 B2
(45) Date of Patent: Sep. 22, 2026

(54) INFORMATION COLLECTION DEVICE FOR SUBSTRATE PROCESSING APPARATUS

(71) Applicant: Tokyo Electron Limited, Tokyo (JP)

(72) Inventors: Yutai Matsuhashi, Iwate (JP); Tsutomu Sugawara, Iwate (JP); Shigehisa Hayashi, Yamanashi (JP); Tadashi Enomoto, Iwate (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 341 days.

(21) Appl. No.: 18/418,580

(22) Filed: Jan. 22, 2024

(65) Prior Publication Data

US 2024/0255928 A1 Aug. 1, 2024

(30) Foreign Application Priority Data

Jan. 26, 2023 (JP) ................................ 2023-010168

(51) Int. Cl.
*G05B 19/418* (2006.01)

(52) U.S. Cl.
CPC ..... *G05B 19/4185* (2013.01); *G05B 19/4183* (2013.01); *G05B 2219/34308* (2013.01)

(58) Field of Classification Search
CPC ........ G05B 19/418; G05B 23/02; H10P 72/00
USPC .......................................................... 700/11
See application file for complete search history.

(56) References Cited

U.S. PATENT DOCUMENTS

2010/0132611 A1* 6/2010 Koyama ............. H10P 72/0612 118/696
2011/0301739 A1* 12/2011 Kataoka .............. H10P 72/3404 700/108
2019/0018400 A1* 1/2019 McCann ............ G05B 23/0221
2019/0188999 A1* 6/2019 Oshima .................. G08C 15/06
2020/0183375 A1* 6/2020 Inoue ................. G05B 23/0227
2021/0157301 A1* 5/2021 Nagata ................. G05B 19/418
2022/0201532 A1* 6/2022 Yamanaka ............ H04L 67/561
2022/0206996 A1* 6/2022 Huang ................... G06N 20/00
2023/0195071 A1* 6/2023 Kazmierski ........ G05B 19/4183 700/121

FOREIGN PATENT DOCUMENTS

JP 2002-015969 A 1/2002
JP 2015-149438 A 8/2015

* cited by examiner

*Primary Examiner* — Md Azad
(74) *Attorney, Agent, or Firm* — Venjuris, P.C.

(57) ABSTRACT

An information collection device includes a power supply unit that supplies power to operate the information collection device; an input unit that is connected to a sensor capable of detecting a state of the substrate processing apparatus and inputs sensor data indicating the state of the substrate processing apparatus detected by the sensor, a relay unit that relays transmission of the sensor data; and a control unit that collects the sensor data input by the input unit through the relay unit.

14 Claims, 3 Drawing Sheets

INFORMATION COLLECTION DEVICE FOR SUBSTRATE PROCESSING APPARATUS

CROSS-REFERENCE TO RELATED APPLICATIONS

This application is based on and claims priority from Japanese Patent Application No. 2023-010168 filed on Jan. 26, 2023, with the Japan Patent Office, the disclosure of which is incorporated herein in its entirety by reference.

TECHNICAL FIELD

The present disclosure relates to an information collection device.

BACKGROUND

Japanese Patent Laid-Open Publication No. 2015-149438 discloses a status reporting device that collects process data detected by sensors provided in processing units when a process related to substrate processing is executed for each of a plurality of the processing units included in a substrate processing apparatus, and transmits the data to a management device.

Japanese Patent Laid-Open Publication No. 2002-015969 discloses a method of processing data from a semiconductor manufacturing device including tools having at least one sensor, a first data communication port, and a second data communication port. The method includes executing operation instructions for the tool through a first port, manipulating at least one sensor to detect and then, report sensor data, and communicating sensor data in a computer-executed data acquisition process, through a second port.

SUMMARY

According to one aspect of the present disclosure, there is provided an information collection device capable of communicating with a substrate processing apparatus. The information collection device includes: a power supply unit that supplies power to operate the information collection device; an input unit that is connected to a sensor capable of detecting a state of the substrate processing apparatus and inputs sensor data indicating the state of the substrate processing apparatus detected by the sensor, a relay unit that relays transmission of the sensor data; and a control unit that collects the sensor data input by the input unit through the relay unit.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
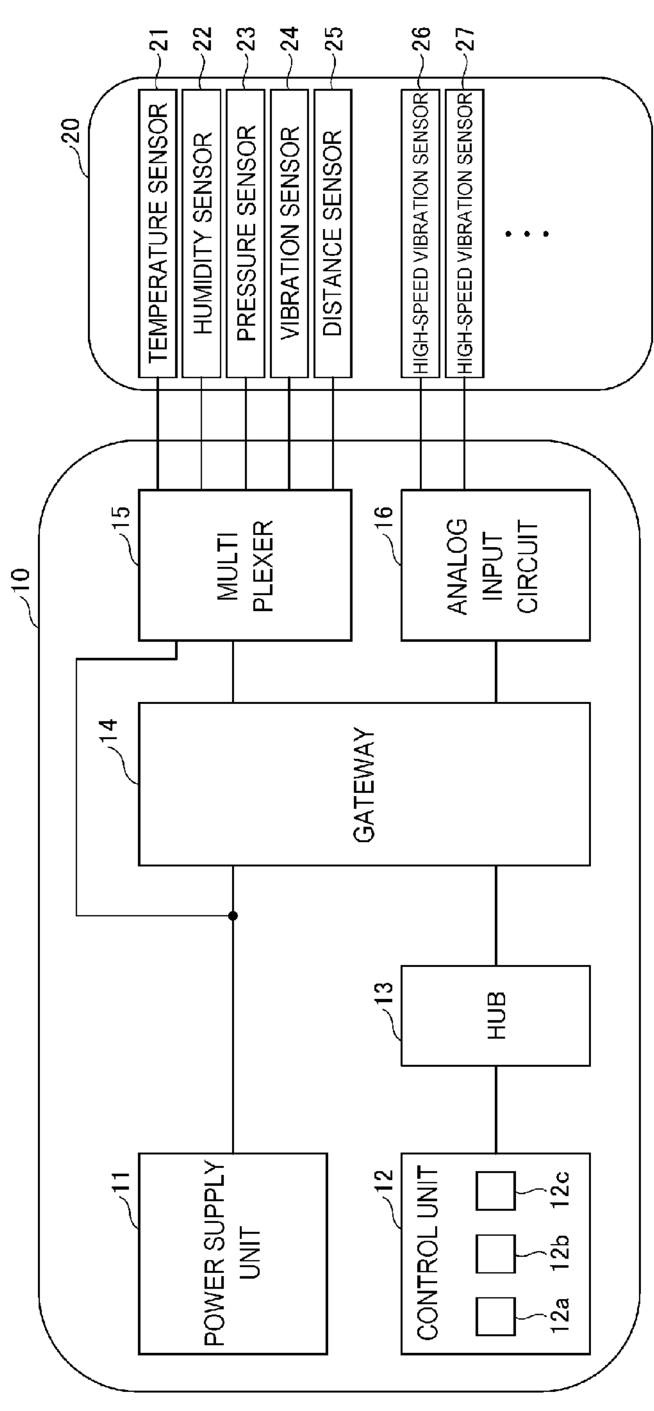
FIG. 1 is a diagram illustrating an example of an information collection device and sensors according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, embodiments of the present disclosure will be described with reference to the drawings. In each drawing, the same components may be denoted by the same reference numerals, and duplicate description may be omitted.

[Preamble]

A substrate processing apparatus has a control device built therein, which controls the substrate processing apparatus when a process is performed within a processing container. In addition, a sensor is previously built into the substrate processing apparatus to detect a state of the substrate processing apparatus. The control device has a function of collecting sensor data detected by the built-in sensor and storing the collected sensor data and a function of communicating with other terminals.

To fit an additional sensor at a location different from the built-in sensor, built a device for collecting sensor data detected by the additional sensor into the substrate processing apparatus, and collect the sensor data, a large renovation is required in the substrate processing apparatus, which takes costs and time. Therefore, until now, sensor data is acquired by only using the control device and the sensor previously built into the substrate processing apparatus, and it has been difficult to retrofit additional sensors or information collection devices to the substrate processing apparatus. Therefore, in an embodiment, there are provided an information collection device and a sensor, which are capable of being retrofitted to a substrate processing apparatus. In the following, an information collection device and a sensor according to an embodiment will be described.

[Information Collection Device and Sensor]

An information collection device 10 and a sensor 20, which are capable of being retrofitted to the substrate processing apparatus, will be described with reference to FIG. 1. FIG. 1 is a diagram illustrating an example of the information collection device 10 and the sensor 20 according to an embodiment.

The information collection device 10 is configured as a member separate from the substrate processing apparatus and may operate independently from the substrate processing apparatus. Accordingly, the information collection device 10 and the sensor 20 may be easily retrofitted to the substrate processing apparatus without increasing the price of the substrate processing apparatus.

Hereinafter, an internal configuration of the information collection device 10 will be described. The information collection device 10 includes a power supply unit 11, a control unit 12, a HUB 13, a gateway 14, a multiplexer 15, and an analog input circuit 16.

The power supply unit 11 supplies power to operate the information collection device 10 independently from the substrate processing apparatus.

The multiplexer 15 and the analog input circuit 16 are connected to sensors capable of detecting a state of the substrate processing apparatus, such as sensors attached to the substrate processing apparatus, and inputs sensor data indicating the state of the substrate processing apparatus detected by the sensors.

The multiplexer 15 may be connected to the gateway 14. The multiplexer 15 is connected to sensors such as a temperature sensor 21, a humidity sensor 22, a pressure sensor 23, a vibration sensor 24, and a distance sensor 25, and inputs digital signal with each sensor data such as temperature, humidity, pressure, vibration, or distances. For example, the temperature sensor 21 may be an infrared thermometer sensor (radiation thermometer sensor), and the distance sensor 25 may be a laser distance sensor. However, the sensors 20 connected to the multiplexer 15 are not limited to the sensors 22 to 25. The multiplexer 15 processes the digital signal of each input sensor data, which is multiplexed into two or more digital signals, and then outputs multiplexed digital signals.

The analog input circuit (board) 16 may be connected to the gateway 14. The analog input circuit 16 is connected to the sensors such as high-speed vibration sensors 26 and 27 and receives analog signals such as high-speed vibration signals. However, the sensors connected to the analog input circuit 16 are not limited to the sensors 26 and 27. The analog input circuit 16 converts an analog signal into a digital signal and outputs the digital signal.

The multiplexer 15 and the analog input circuit 16 are an example of an input unit that is connected to the sensors capable of detecting the state of the substrate processing apparatus, such as sensors attached to the substrate processing apparatus, and that inputs sensor data indicating the state of the substrate processing apparatus detected by the sensors.

The HUB 13 and the gateway 14 are examples of relay units that relay sensor data transmitted from the input unit. The gateway 14 is a mechanism that communicates with the sensor 20 at a terminal, regardless of whether it is in a wired or wireless manner, and relays, for example, different networks.

The gateway 14 communicates with the multiplexer 15 by an inter-integrated circuit (I2C) method. The gateway 14 is connected to the analog input circuit 16 by a universal serial bus (USB). The control unit 12 is connected to the gateway 14 through the HUB 13. The HUB 13 transmits sensor data transmitted by the gateway 14 to the control unit 12. The gateway 14 and the HUB 13 are examples of relays that transmit sensor data input by the multiplexer 15 and the analog input circuit 16.

In the example of FIG. 1, the gateway 14 and the HUB 13 are connected in a manner of 1:1, but are not limited thereto. The gateway 14 is scalable and may be multiplied, and the gateway 14 and the HUB 13 may be connected in a manner of n:1 (n is an integer greater than 1). By installing additional gateways 14, an upper limit on the number of additional sensors 20 attached to the substrate processing apparatus may be eliminated.

The control unit 12 collects sensor data input by the multiplexer 15 and the analog input circuit 16 through the gateway 14 and the HUB 13.

The control unit 12 processes computer-executable instructions that cause the substrate processing apparatus to execute various processes (substrate processing) described in the present disclosure. The processes executed by the substrate processing apparatus include substrate etching processing, film formation processing, and ashing processing. The control unit 12 controls each element of the substrate processing apparatus to execute various processes described herein.

The control unit 12 may include a processing unit 12*a*, a storage unit 12*b*, and a communication interface 12*c*. The control unit 12 is implemented, for example, by a computer 2*a*.

The processing unit 12*a* may be configured to read the sensor data and analysis program from the storage unit 12*b* and execute the analysis program based on the read sensor data to analyze the collected sensor data. The program may be stored in advance in the storage unit 12*b* or may be acquired through a medium when necessary. The acquired program is stored in the storage unit 12*b*, and is read from the storage unit 12*b* by the processing unit 12*a* to be executed. The medium may be any computer-readable storage medium, or may be a communication line connected to the communication interface 12*c*.

The processing unit 12*a* may be a micro-computer or a central processing unit (CPU). The storage unit 12*b* may include a random access memory (RAM), a read only memory (ROM), a hard disk drive (HDD), a solid state drive (SSD), or a combination thereof. The communication interface 12*c* may communicate with the substrate processing apparatus through a communication line such as a local area network (LAN). The communication interface 12*c* may communicate with the substrate processing apparatus in a wired or wireless manner.

The memory unit 12*b* accumulates the collected sensor data. The communication interface 12*c* may transmit sensor data collected from the sensor 20 to the control device. The communication interface 12*c* may transmit a result obtained by analyzing the state of the substrate processing apparatus based on the sensor data collected from the sensor 20, to the control device. The control device may accumulate sensor data collected from the sensor 20 in its own storage unit, compare the sensor data collected from the sensor 20 with sensor data collected from an existing sensor described later, and analyze the state of the substrate processing apparatus from a result of the comparison.

In this way, the information collection device 10 may collect sensor data independently of the control device built into the substrate processing apparatus. In addition, the information collection device 10 may collect sensor data in conjunction with the control device built into the substrate processing apparatus.

[Example of Arrangement in Substrate Processing Apparatus]

Figure 2:
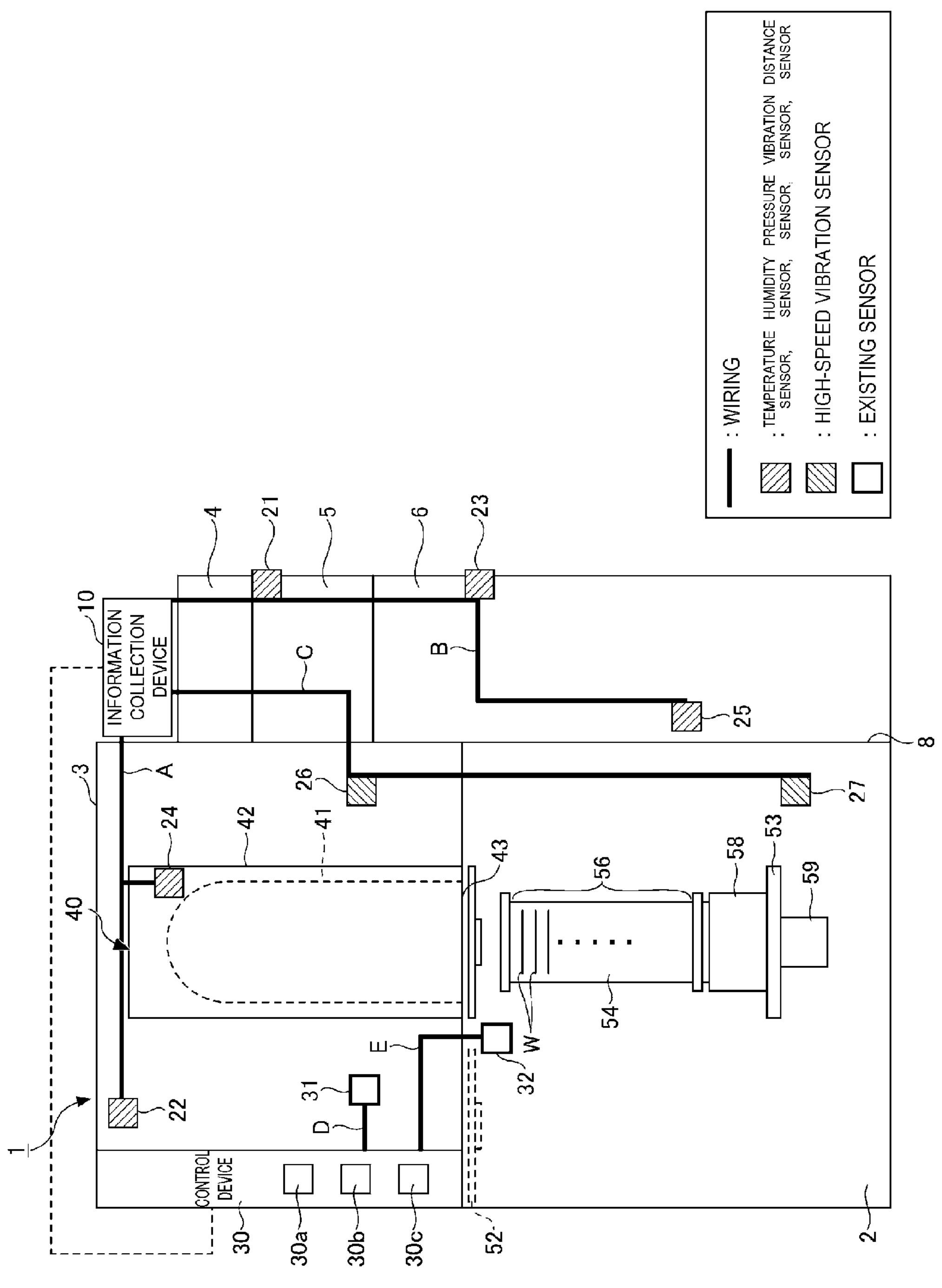
FIG. 2 is a diagram illustrating an example of a substrate processing apparatus on which the information collection device is disposed, according to an embodiment.

Next, descriptions will be made on an example of the substrate processing apparatus on which the information collection device 10 is disposed, with reference to FIG. 2. FIG. 2 is a diagram illustrating an example of the substrate processing apparatus on which the information collection device 10 according to an embodiment is disposed. In the example of FIG. 2, the substrate processing apparatus 1 is a chemical vapor deposition (CVD) apparatus and is a batch-type apparatus that processes multiple substrates at once.

The substrate processing apparatus 1 has an area 3 having a vertical processing container 40 (vertical furnace) where a plurality of substrates W, for example, semiconductor wafers, are held and accommodated at predetermined intervals in a vertical direction in a boat 54, and various heat treatments such as oxidation, diffusion, and reduced pressure CVD may be performed on the substrates W. The processing container 40 has a reaction tube 41 and a heater 42. By supplying a processing gas to the substrate W installed in the reaction tube 41 of the processing container 40, a desired film is formed on the substrate W by a CVD method.

In a loading area 2, the substrate W is transferred between an accommodation container (not illustrated) for the substrate W and the boat 54, and the boat 54 where the plurality of substrates W are disposed is loaded into the processing container 40 from the loading area 2. The substrate processing apparatus 1 performs film formation processing using a film formation gas on the plurality of substrates at once. After the film formation processing, the boat 54 is unloaded into the loading area 2.

In the loading area 2, a shutter mechanism 52, the boat 54, and a transfer mechanism (not illustrated) are provided. The shutter mechanism 52 is provided at an upper portion of the loading area 2. The shutter mechanism 52 suppresses heat in the processing container 40 from being emitted from a furnace opening 43 to the loading area 2. The boat 54 has a stage 56 for placing the substrate W, a heat insulation container 58, a cover body 53, and a rotation mechanism 59. The heat insulation container 58 serves to prevent cooling of the boat 54 (stage 56) due to heat transfer with the cover body 53 and to insulate the boat 54. The rotation mechanism 59 serves to rotate the boat 54. A rotation axis of the rotation mechanism 59 air-tightly penetrates the cover body 53 and rotates a rotary table (not illustrated) disposed on the cover body 53.

An exhaust box 6, a cooling unit 5, and an $N_2$ gas purge unit 4 are provided at a back door 8 of the substrate processing apparatus 1. The film formation gas supplied to the processing container 40 flows from bottom to top within the reaction tube 41, is sucked into an annular space of the reaction tube 41, and is exhausted to the outside through the exhaust box 6.

The information collection device 10 is externally attached to the outside of the substrate processing apparatus 1 and may be easily attached and detached. In the example of FIG. 2, the information collection device 10 may be attached to and detached from the $N_2$ gas purge unit 4 above the exhaust box 6 at the back door 8.

The information collection device 10 is connected to the additional sensors 20 (21 to 27) that are retrofitted to the substrate processing apparatus 1. Wiring A connects the humidity sensor 22 and the vibration sensor 24 with the information collection device 10. Wiring B connects the temperature sensor 21, the pressure sensor 23, and the distance sensor 25 with the information collection device 10. Wiring C connects the high-speed vibration sensors 26 and 27 with the information collection device 10.

A control device 30 that controls an entirety of the substrate processing apparatus 1 is previously attached to the substrate processing apparatus 1. The control device 30 is previously attached to the substrate processing apparatus 1 and is not able to be detached from the substrate processing apparatus 1. Additionally, the control device 30 is connected to existing sensors 31 and 32 previously installed in the substrate processing apparatus 1. Wiring D connects the sensor 31 with the control device 30, and wiring E connects the sensor 32 with the control device 30.

The control device 30 has a processing unit 30*a*, a storage unit 30*b*, and a communication interface 30*c*. The processing unit 30*a* may be configured to read a process execution program from the storage unit 30*b* and execute the process execution program based on read sensor data, thereby executing a process. This program may be stored in advance in the storage unit 30*b* or may be acquired through a medium when necessary. The acquired program is stored in the storage unit 30*b* and is read from the storage unit 30*b* by the processing unit 30*a* to be executed. The medium may be any computer-readable storage medium, or may be a communication line connected to the communication interface 30*c*.

Additionally, the processing unit 30*a* accumulates sensor data collected from the sensors 31 and 32 in the storage unit 30*b*. The processing unit 30*a* may be configured to read sensor data and an analysis program from the storage unit 30*b*, and execute the analysis program based on the read sensor data to analyze the collected sensor data.

The communication interface 30*c* is communicable with the communication interface 12*c* of the information collection device 10 in a wired or wireless manner. Accordingly, the information collection device 10 transmits the collected sensor data of the additional sensor 20 and/or a result analyzed from the collected sensor data of the additional sensor 20 to the control device 30.

The processing unit 30*a* may compare the sensor data stored in the storage unit 30*b* with the sensor data transmitted from the information collection device 10 to analyze the state of the substrate processing apparatus 1. The sensor data and/or analysis results transmitted from the information collection device 10 are stored in the storage unit 30*b*.

The processing unit 30*a* may be a CPU. The storage unit 30*b* may include a RAM, a ROM, a HDD, an SSD, or a combination thereof. The communication interface 30*c* may communicate with the substrate processing apparatus through a communication line such as a local area network (LAN).

The input unit (the multiplexer 15 and the analog input circuit 16) of the information collection device 10 is attached in advance to the substrate processing apparatus 1 and is connected to second sensors that are added to the substrate processing apparatus and that are different from the first sensors connected to the control device 30. The input unit collects sensor data from the second sensors. In the example of FIG. 2, the sensors 31 and 32 are examples of the first sensors (existing sensors), and the additional sensors 20 (21 to 27) are examples of the second sensors.

The additional sensors 20 may be sensors of the same type as either of the sensors 31 and 32 or may be a different type of sensors. The additional sensors 20 are attached to locations of the substrate processing apparatus 1 that are different from locations where the sensors 31 and 32 are disposed.

Additionally, the control unit 12 may collect image data obtained by capturing an image of the substrate processing apparatus 1 or the like by an image capturing device, such as a camera or the like, in addition to the sensor data input by the input unit. The image capturing device is an example of the additional sensor 20, and the captured image data is an example of sensor data. The captured image data may be acquired directly by the control unit 12 or may be collected through the relay unit (the gateway 14).

[Effect]

The control device 30 that is built into the substrate processing apparatus 1 is configured integrally with the substrate processing apparatus 1 and is not able to operate independently from the substrate processing apparatus 1. In addition, the first sensors are sensors that are previously installed in the substrate processing apparatus 1 and additional first sensors cannot be installed therein.

In contrast, the information collection device 10 is configured as a member separate from the substrate processing apparatus 1 and is able to operate independently from the substrate processing apparatus 1. By configuring the information collection device 10 as a separate member from the substrate processing apparatus 1, the information collection device 10 may be detachably attached externally to the substrate processing apparatus 1 without an increase in the price of the substrate processing apparatus 1.

In addition, the additional sensor 20 may be installed at an appropriate location of the substrate processing apparatus 1, and an upper limit on the number of sensors attached to the substrate processing apparatus 1 is eliminated. In addition, when the collection of sensor data is unnecessary, the information collection device 10 and the sensors 20 may be easily detached from the substrate processing apparatus 1.

Additionally, the information collection device 10 and the sensors 20 are capable of wireless or wired communication with the substrate processing apparatus. By using wireless communication, the information collection device 10 and the sensors 20 may be easily installed even at locations where wiring in a wired manner is difficult, and man-hours required to start collecting sensor data may be reduced.

In this way, installation of more sensors 20 and collection of sensor data are facilitated, so that it is possible to increase a type and amount of the sensor data capable of being handled by the substrate processing apparatus 1. For this reason, the accuracy of data analysis based on the collected sensor data is improved, and data analysis results may be effectively utilized in the substrate processing apparatus 1.

For example, by combining more types of sensors than before, it is possible to predict situations related to the substrate processing apparatus or processes that could not be predicted until now. For example, by disposing vibration sensors at various locations in the substrate processing apparatus 1 and analyzing the behavior of sensor data detected by each of the vibration sensors, the most suitable location for sensing by the vibration sensor may be confirmed. Based on these analysis results, vibration sensors may be installed at appropriate locations and perform sensing.

In addition, for example, by additionally installing the temperature sensor 22 illustrated in FIG. 2 in the area 3 where the reaction tube 41 and the heater 42 are installed, a temperature control performance of the heater 42 may be improved.

[The Others]

As illustrated in FIG. 2, the information collection device 10 is not limited to being disposed on the substrate processing apparatus 1 and may be connected to a network capable of communicating with the substrate processing apparatus 1.

Figure 3:
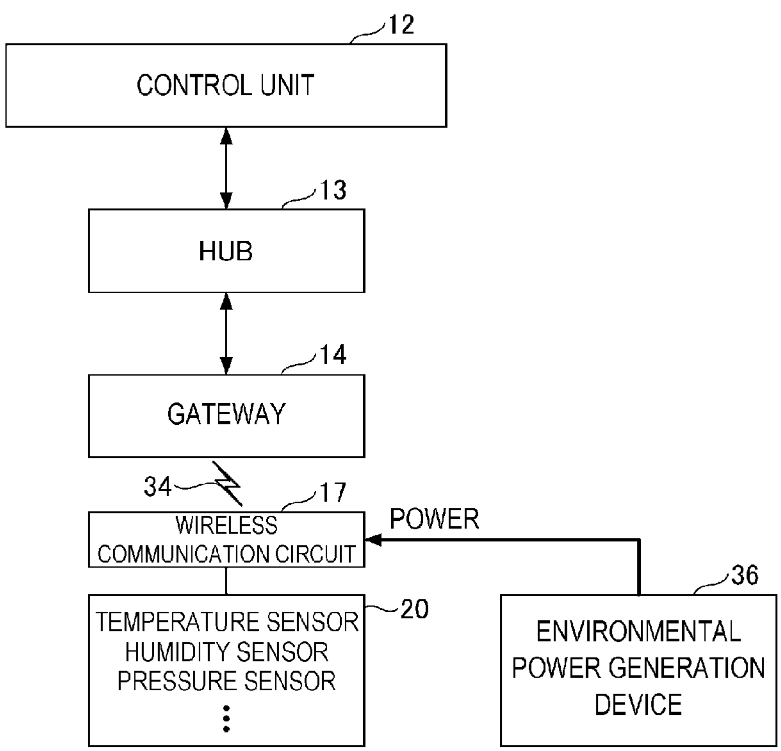
FIG. 3 is a diagram illustrating an example of the information collection device having an environmental power generation device according to an embodiment.

In addition, as illustrated in FIG. 3, the information collection device 10 may supply, from an environmental power generation device 36, power that is used when transmitting sensor data from a wireless communication circuit 17 to the gateway 14 by wireless communication 34. The wireless communication circuit 17 is an example of an input unit.

The wireless communication circuit 17 transmits the sensor data that is detected by the sensors 20 to the control unit 12 via the gateway 14 through the wireless communication 34 by using the power supplied from the environmental power generation device 36. Accordingly, when collecting the sensor data, it is possible to promote energy saving and establish a system that takes the environment into consideration by storing electricity in the environmental power generation device 36, such as a solar cell or thermoelectric element.

Additionally, the control device 30 may be an autonomous controller AC that collects the sensor data via a machine controller MC that controls sensors or robots.

As described above, according to embodiments of the present disclosure, it is possible to provide the information collection device 10 and the sensors 20 capable of being retrofitted to the substrate processing apparatus 1. Accordingly, sensor data may be collected to include sensor data that is detected by the sensors 20 capable of being retrofitted to the substrate processing apparatus 1, and the type and amount of the sensor data may be increased. For this reason, the accuracy of data analysis based on the collected sensor data is improved, and data analysis results may be effectively utilized in the substrate processing apparatus 1.

The information collection device 10 according to the embodiment presently disclosed should be considered in all respects as examples and should not be considered as limiting them. The embodiments may be modified and improved in various forms without departing from the appended claims and general spirit thereof. The matters described in a plurality of the embodiments may obtain other configurations within a range that is not inconsistent, and may be combined within a range that is not inconsistent.

The substrate processing apparatus disclosed in this specification is not limited to a batch type apparatus and may be a single wafer type apparatus that processes substrates one by one. In addition, for example, the substrate processing apparatus 1 may be a multiple wafer type apparatus provided with a plurality of stages in one processing container. In addition, the substrate processing apparatus 1 may be a semi-batch type apparatus that rotates a plurality of substrates placed on a rotary table in a processing container by a rotary table and sequentially passes them through an area where one film formation gas is supplied and an area where another gas is supplied to thereby perform treatment on the substrates.

Additionally, the substrate processing apparatus disclosed in this specification may be an apparatus that processes a substrate using plasma, or may be an apparatus that processes a substrate without using plasma.

The substrate processing apparatus of the present disclosure may be applied to any type of an atomic layer deposition (ALD) apparatus, a capacitively coupled plasma (CCP) apparatus, an inductively coupled plasma (ICP) apparatus, a radial line slot antenna (RLSA) apparatus, an electron cyclotron resonance plasma (ECRP) apparatus, and a helicon wave plasma (HWP) apparatus.

According to one aspect, there is provided an information collection device capable of being retrofitted to a substrate processing apparatus, which collects information about the substrate processing apparatus.

From the foregoing content, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting, with the true scope and spirit being indicated by the following claims.

What is claimed is:

1. An information collection device comprising:

a power supply configured to supply power to operate the information collection device;

an input port connected to a sensor capable of detecting a state of a substrate processing apparatus and configured to input sensor data indicating the state of the substrate processing apparatus detected by the sensor, a relay configured to relay transmission of the sensor data; and a controller configured to collect the sensor data input by the input port through the relay, wherein the information collection device is separately provided from the substrate processing apparatus, and the sensor connected to the input port includes one or more second sensors that are additionally installed on the substrate processing apparatus and that are different from first sensors previously attached to the substrate processing apparatus and connected to a control device of the substrate processing apparatus.

2. The information collection device according to claim 1, wherein the information collection device is detachably disposed on the substrate processing apparatus.

3. The information collection device according to claim 1, wherein the information collection device collects the sensor data, independently of or in conjunction with a control device built into the substrate processing apparatus.

4. The information collection device according to claim 1, wherein the second sensors are attached to locations in the substrate processing apparatus that are different from locations where the first sensors are disposed.

5. The information collection device according to claim 1, wherein the controller transmits at least one of the collected sensor data of the second sensors and a result analyzed from the collected sensor data of the second sensors, to the control device.

6. The information collection device according to claim 5, wherein the information collection device is capable of communicating with the substrate processing apparatus via a wired communication or a wireless communication.

7. The information collection device according to claim 5, further comprising:

an environmental power generator configured to supply power that is used when wirelessly transmitting the sensor data from the input port to the relay.

8. The information collection device according to claim 5, wherein the controller collects, as the sensor data, image data obtained by capturing an image of the substrate processing apparatus by an image capturing device, through the relay or not through the relay, in addition to the sensor data input by the input port.

9. The information collection device according to claim 1, wherein the information collection device is capable of communicating with the substrate processing apparatus via a wired communication or a wireless communication.

10. The information collection device according to claim 1, further comprising:

an environmental power generator configured to supply power that is used when wirelessly transmitting the sensor data from the input port to the relay.

11. The information collection device according to claim 1, wherein the controller collects, as the sensor data, image data obtained by capturing an image of the substrate processing apparatus by an image capturing device, through the relay or not through the relay, in addition to the sensor data input by the input port.

12. The information collection device according to claim 1, wherein the one or more second sensors are installed on the substrate processing apparatus without modifying the control device of the substrate processing apparatus.

13. The information collection device according to claim 1, wherein the one or more second sensors are configured to provide the sensor data to the input port without passing through the control device of the substrate processing apparatus.

14. The information collection device according to claim 1, wherein the one or more second sensors are not electrically connected to the control device of the substrate processing apparatus.

* * * * *